(12) United States Patent
Benton

(10) Patent No.: US 6,414,727 B1
(45) Date of Patent: Jul. 2, 2002

(54) VIDEO PROJECTION HOLOGRAPHIC SCREEN, SYSTEM AND METHOD

(75) Inventor: Stephen A. Benton, Lincoln, MA (US)

(73) Assignee: Corporation for Laser Optics Research, Portsmouth, NH (US)

( * ) Notice: Subject to any disclaimer, the term of this patent is extended or adjusted under 35 U.S.C. 154(b) by 0 days.

(21) Appl. No.: 09/355,598

(22) PCT Filed: Jan. 28, 1998

(86) PCT No.: PCT/US98/01718

§ 371 (c)(1),
(2), (4) Date: Jul. 27, 1999

(87) PCT Pub. No.: WO98/35498

PCT Pub. Date: Aug. 13, 1998

Related U.S. Application Data

(60) Provisional application No. 60/036,438, filed on Jan. 28, 1997.

(51) Int. Cl.[7] .............................. H04N 5/74; H04N 9/31; G03B 21/60
(52) U.S. Cl. .................... 348/744; 359/459; 359/443
(58) Field of Search ........................... 348/40, 41, 744, 348/756, 762, 767, 750; 359/456, 452, 455, 454, 458, 459, 443; H04N 5/74, 9/31

(56) References Cited

U.S. PATENT DOCUMENTS

| 4,720,747 A | 1/1988 | Crowley | |
|---|---|---|---|
| 4,851,918 A | 7/1989 | Crowley | |
| 5,011,244 A | 4/1991 | Smith et al. | 350/3.75 |
| 5,253,073 A | 10/1993 | Crowley | |
| 5,296,965 A | 3/1994 | Uetsuki et al. | 359/459 |
| 5,311,321 A | 5/1994 | Crowley | |
| 5,335,022 A | 8/1994 | Braun et al. | |
| 5,486,884 A | 1/1996 | De Vaan | |
| 5,621,486 A | 4/1997 | Doany et al. | |
| 6,147,801 A | * 11/2000 | Goldenberg et al. | 349/456 |

FOREIGN PATENT DOCUMENTS

| EP | 0373821 | 12/1989 | G03H/1/28 |
|---|---|---|---|
| JP | 4-136885 | 9/1990 | |
| JP | 4-355747 | 6/1991 | |
| JP | 5-88020 | 9/1991 | |
| JP | 5-333435 | 6/1992 | |
| JP | 7-23345 | 9/1993 | |
| WO | WO 95/35832 | 12/1995 | G02B/5/32 |
| WO | WO 98/35260 | 8/1998 | G02B/27/01 |

* cited by examiner

Primary Examiner—Michael H. Lee
(74) Attorney, Agent, or Firm—Ropes & Gray

(57) ABSTRACT

A laser projection video system and a holographic screen. The system includes a pulsed laser video image system with a holographic screen to receive the full color video image, which screen has a holographic layer (layer 1) to reflect back the full color video image to the viewer and to transmit through the screen the ambient light to provide high video picture contrast.

20 Claims, 4 Drawing Sheets

VIDEO PROJECTION HOLOGRAPHIC SCREEN, SYSTEM AND METHOD

REFERENCE TO PRIOR APPLICATION

This application incorporates by reference and claims the benefit of U.S. Provisional Application Serial No. 60/036,438, filed Jan. 28, 1997.

FIELD OF THE INVENTION

The invention relates to laser projection video screen systems and methods employing a pulsed laser source and holographic projection screens.

BACKGROUND OF THE INVENTION

It has been difficult to project viewable images onto any conventional front projection screen by video projection devices powered by incandescent light sources such as CRT projectors or LCD/light valve projectors with xenon/metal halide lamps under extremely high ambient lighting conditions (outdoors in daytime, for example).

There are two problems. First, a traditional, white, front projection screen returns projected light in a random manner and is referred to as a Lambertian Scatterer with the brightness of the image appearing the same, regardless of the viewer location. This white front projection screen is typically used as a reference point, so that if a screen is able to return a projected image in a more spatially selective manner, then the screen appears brighter and is said to have "again". The typical white front projection screen is considered to have a gain of 1; whereas, a front projection screen having more sophisticated structures that are designed to limit the returning projected image light to a specified range of horizontal and vertical direction by use of glass beads or other materials with known scattering angles is considered to have a higher gain. The gain of the screen may be a critical component to reproduce the projected image with enough contrast. When the traditional front projection screen is used in bright ambient light conditions, it will reflect back not only the projected images, but also a large portion of undesirable bright ambient light toward the direction of the viewer; therefore, high picture contrast cannot be attained.

A second problem is that the conventional video projection device is powered by an incandescent light source. Since the incandescent light source produces incoherent light rays, they have more chance of being dispersed by random scattering as they travel through the air from the projection device to the screen. The longer the projection throw distance is, the more image dispersion they suffer.

Laser video projection systems with projection screen surfaces are described in U.S. Pat. No. 4,720,747, issued Jan. 19, 1988; U.S. Pat. No. 4,851,918, issued Jul. 25, 1989; U.S. Pat. No. 5,253,073, issued Oct. 12, 1993; and U.S. Pat. No. 5,311,321, issued May 10, 1994, all hereby incorporated by reference.

It is desirable to provide an improved video projection screen, system and method to minimize image dispersion between the projector and screen and to provide screen designs which reflect back the projected image in the viewer direction.

SUMMARY OF THE INVENTION

The invention relates to a holographic projection screen and to laser video projection systems and methods employing the holographic screens.

The laser video projection system of the invention comprises a video projection device employing, for example, red (R), green (G) and blue (B) monochromatic laser light sources to form a projected full color video image, and which system includes a projection screen with a holographic pattern on the screen surface which reflects back the projected image in a selected direction, and transmits the majority of ambient light through the screen to provide a high video picture contrast on the screen.

The method comprises projecting a laser video image, typically employing R,G and B pulsed lasers to provide a full color video image onto a projection screen with a selected holographic design, in one or multiple layers on the screen surface to reflect back substantially the full color image to a viewer and to transmit the majority of ambient light through the projection screen.

A viewable projected image onto the screen is achieved by front projection format under high ambient light conditions by:

a) a video projection device powered by coherent/laser light sources (R,G,B) to minimize the image dispersion between the projector and the screen; and b) a special front projection screen design which only reflects back the projected image to the direction of the viewers, and not to the surrounding areas where no viewer will be (highly directional design), and transmits the majority of the ambient light through the screen so that high picture contrast can be achieved.

This invention embodies two different front projection screen designs incorporating holographic patterns which can be used beneficially with video projection devices powered by laser light sources (R,G,B).

Because a full color video projection device powered by laser light sources (R,G,B) produces specific monochromatic wavelengths of red, green and blue light, it is ideal to construct reflective viewing screens with holographic patterns that will reflect back only those wavelengths of red, green and blue used in the laser video projection device.

The first design is a diffusely-reflecting holographic screen with exceptionally high gain (i.e., well defined viewing cone) which will be best suited for uses under high ambient light conditions. This screen design reflects only the specific monochromatic wavelengths of red, green and blue used in the laser video projection device, therefore, it will not be optically usable with other conventional video projection devices powered by incandescent light sources.

Because the holographic patterns constructed on the screen surface only reflect the specific monochromatic wavelengths of red, green and blue back to the viewers, all other wavelengths from the ambient light will pass through the screen. This will help to increase image contrast and thus make the image much easier to view under high ambient light conditions.

The high transmission of visible wavelengths, except for the specific monochromatic ones generated by the laser video projection device, means that the screen could offer considerable "see-through" features for blending the projected images with real background scenes behind the screen.

Holographic pattern is constructed to direct incoming specific monochromatic light from the laser video projection device into predetermined horizontal and vertical energy distribution zones, thus, this screen produces very bright images by virtue of shaping most of the projected R,G,B laser image light into very well defined, narrow viewing cones.

The method used in the recording of the holographic patterns ensures that there is maximum of diffraction at the specific monochromatic wavelengths from the laser video projection device, so that high reflection of those wavelengths towards the viewer or other direction is achieved.

Mass production of this screen is available once a printing process has been established for this type of hologram. This technique literally uses a modified optical contact printing process to bring the hologram onto thin layers of photopolymerizable plastic materials (typically less than 0.0002" thick) supported on polycarbonate or polyester film. The holographic pattern is transferred at high speed onto the film, and the completed screen itself ends up on a roll from which the user can cut a piece to the unit size (typically 40" wide by 80" high). When a larger screen is required, it can be constructed by tiling smaller hologram units with nearly invisible seams. The hologram may consist of a single diffracting layer or a sandwich of two or three such layers, each optimized for separated wavelength regions.

In another embodiment a second design is a multi-layered holographic screen comprised of a diffusely-reflecting layer, as discussed above, plus an additional layer with diffracting holographic patterns which direct the reflected R,G,B laser images by the diffusely-reflecting layer into pre-determined selected "left" and "right" viewing zones.

Two video projection devices powered by R,G,B laser light sources receive stereoscopic video input signals derived from two displaced cameras. The resulting "left" and "right" images are front projected onto the multi-layer holographic screen described herein.

Alternatively, when the laser video projection device is similar to the one disclosed in U.S. Pat. No. 4,720,747, two independent transducers attached on a single acousto-optic cell receive the stereoscopic video input signals described above, and the acousto-optic cell is then illuminated by two thin, well-collimated lines generated by a single pulse from a source laser, it will result in two images, a "left" and a "right" stereoscopic image. These "left" and "right" images are relayed to two separate output optic channels, each of which consists of a vertical scanner and a set of projection optics that focus "left" and "right" images onto the multi-layer holographic screen. This method is more attractive than the one described above, because a single laser video projector can generate both of the required stereoscopic images.

The first layer of the multi-layer holographic screen is made of transparent plastic material (either polycarbonate or polyester film) having diffracting holographic patterns printed on the back surface; therefore, the projected R,G,B laser images will transmit through the first layer.

The second layer is a diffusely-reflecting holographic screen; thus, the image will be formed and a majority of the R,G,B laser image light will be reflected back toward the viewer. Then, the diffracting holographic patterns printed on the back of the first layer will direct the reflected stereoscopic R,G.,B laser images into pre-determined "left" and "right" viewing zones as the reflected images pass through the first layer, creating the effect of a 3-dimensional ("3D") image to the viewer.

This multi-layer, three dimensional, holographic screen design will pass all the other wavelengths from the ambient light source through the screen, similar to the first holographic screen, reflecting back only the red, green and blue laser wavelengths from the laser video projector used, which will help increase the image contrast ratio.

This multi-layer, three dimensional holographic screen can be mass produced in a similar manner (i.e., contact-copying process) as the first holographic screen with high gain.

The holographic projection screen is particularly adapted for use in pulsed laser video systems and methods; however, the holographic projection screen may also be employed with, and has advantages with, other light image projection systems and methods incorporating monochromatic or semi-monochromatic R,G,B light sources.

The invention will be described for the purpose of illustration only in connection with certain illustrated embodiments; however, it is recognized that various changes, modifications, additions and improvements may be made in the illustrative embodiments without departing from the scope of the invention.

DESCRIPTION OF THE EMBODIMENTS

Figure 1:
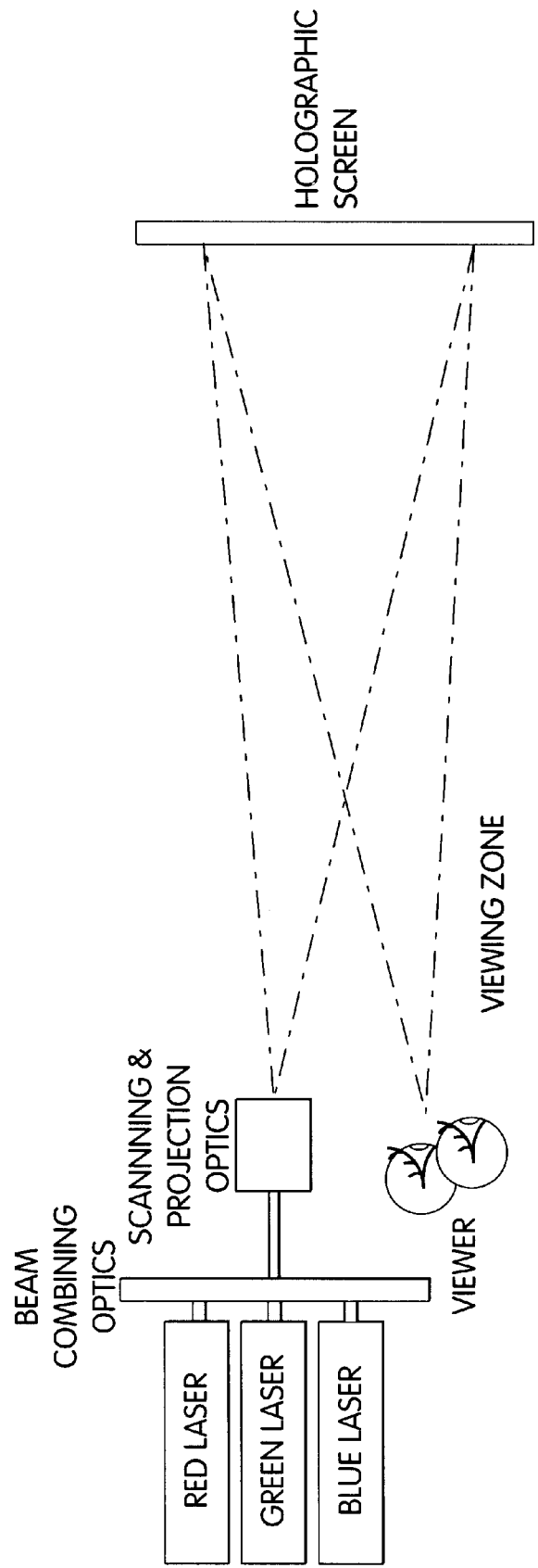
FIG. 1 is a functional block flow diagram of the invention with a laser video projection system with an enlarged holographic screen.

FIG. 1 is a schematic diagram of a laser projection system incorporating red (R), green (G) and blue (B) lasers with holographic reflective viewing projection screen, illustrating the formation of narrow-angle viewing zone due to focusing by the viewing screen.

Figure 2:
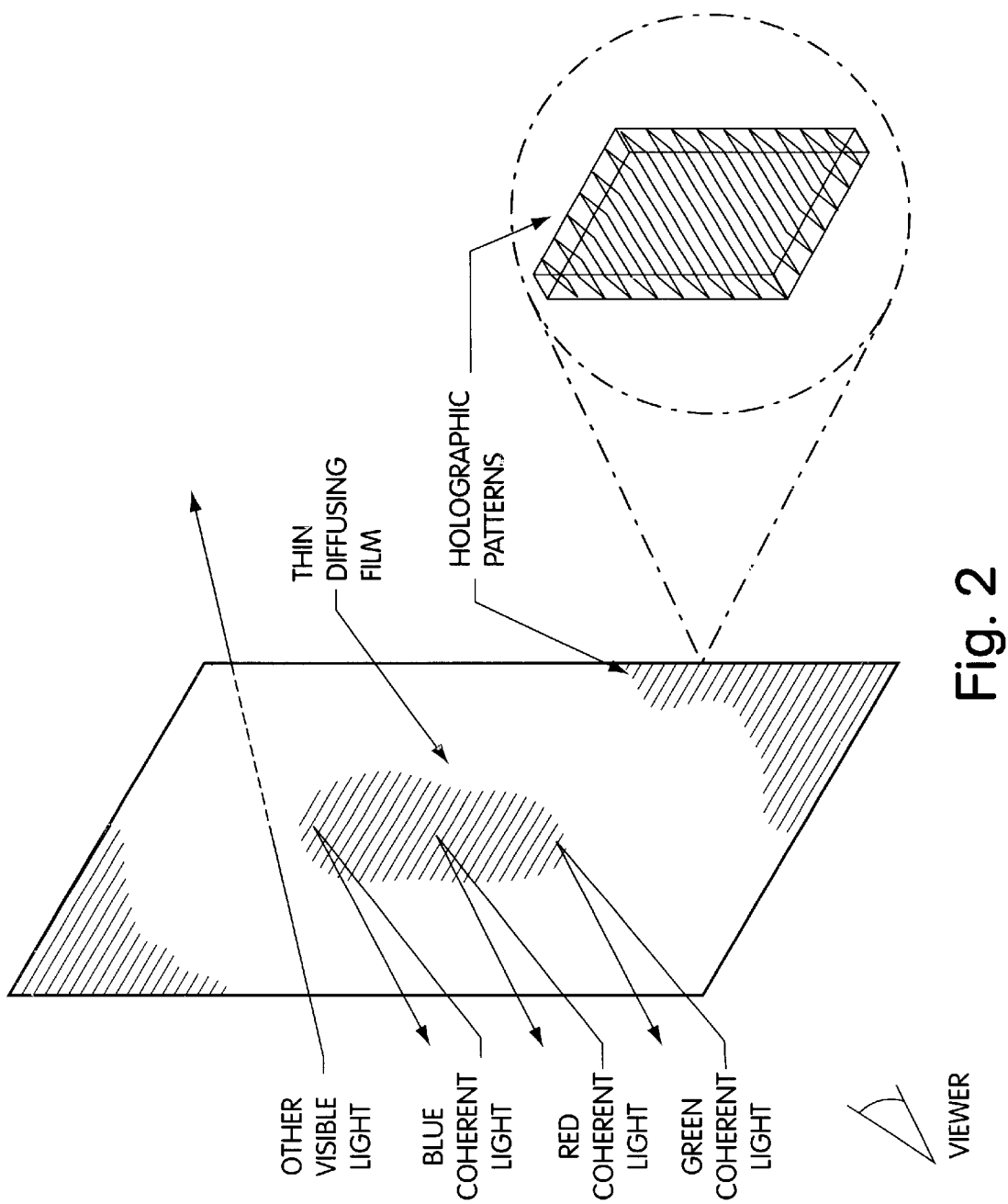
FIG. 2 is a schematic drawing of holographic reflecting gratings on diffused thin film projection screen surface.

FIG. 2 illustrates the holographic patterns reflected back by specific wavelengths of R,G,B light produced by the laser projection system, with other visible light transmitted through the screen; thereby, a high contrast image can be formed and observed by the viewers located within the viewing zone. Further, FIG. 2 shows the specific arrangement of one holographic pattern used.

Figure 3:
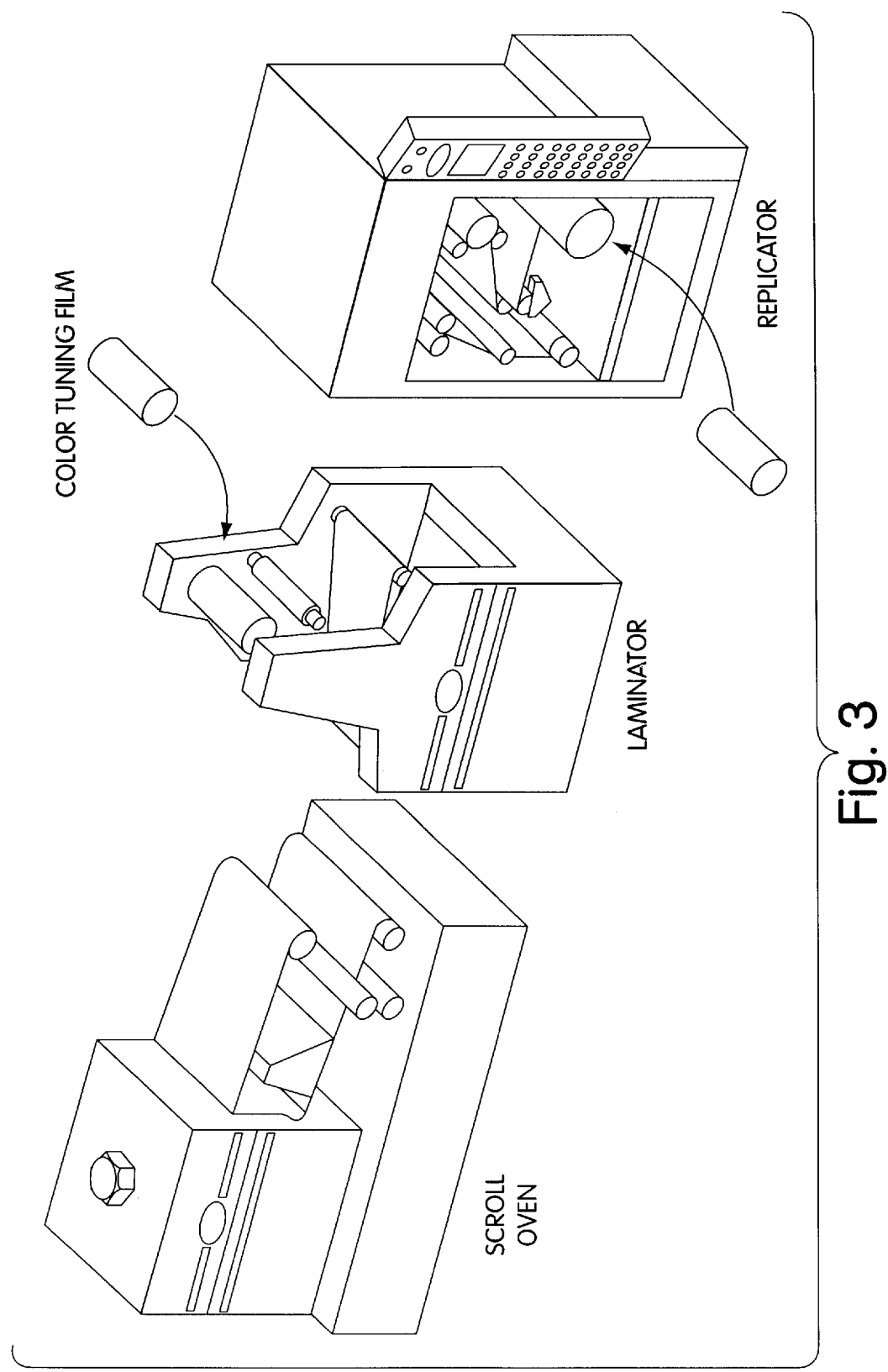
FIG. 3 is a contact-copying system and process for holographic patterns on the projection screen.

FIG. 3 illustrates a mass production contact-copying system and process for the holographic patterns which includes a replicator, a laminator and a scroll oven. The replicator reproduces duplicate copies of original holographic patterns by bringing the hologram onto thin layers of photopolymerizable plastic material; the laminator transfers the holographic pattern at high speed onto polycarbonate or polyester film; and the scroll oven rolls up the finished film with hologram printed on it.

Figure 4B:
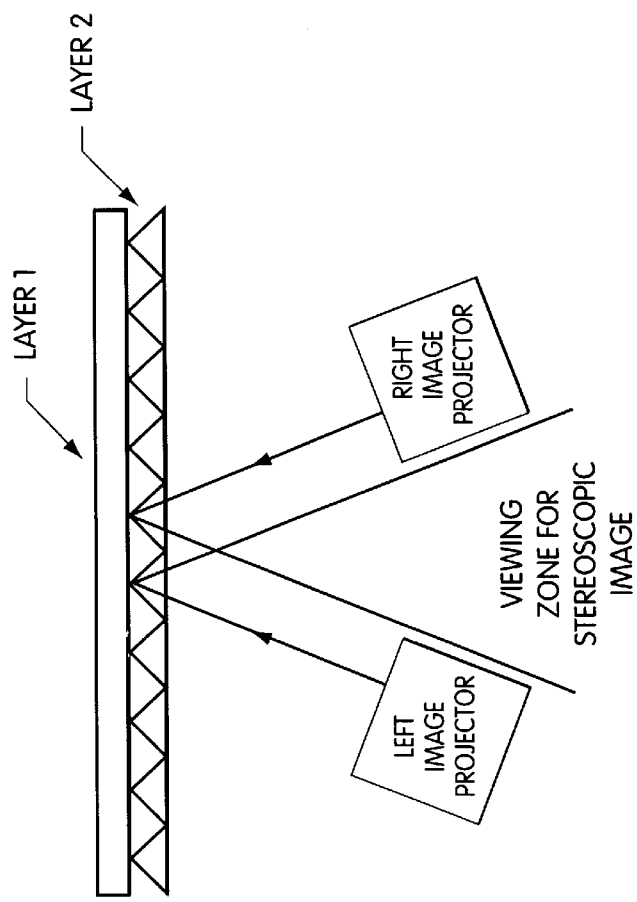
FIG. 4B is a top view of a projection arrangement using the holographic diffraction system.
Figure 4A:
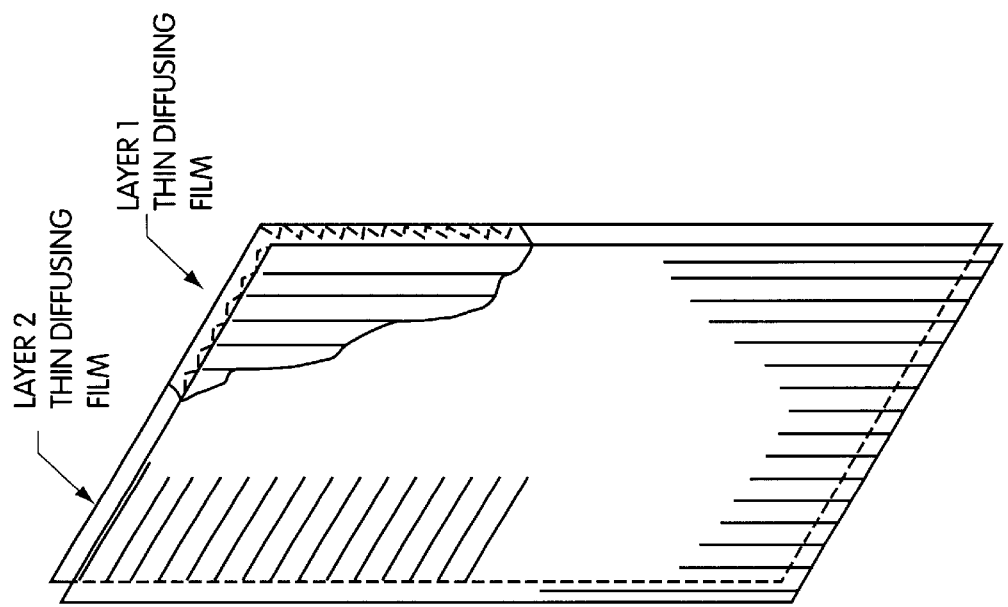
FIG. 4A is a schematic perspective view drawing of a holographic diffraction system with grating on a transparent thin film surface.

FIGS. 4A and 4B illustrate schematically a holographic diffraction pattern, as well as a block diagram of this multilayer holographic screen embodiment, with reflective and diffractive patterns working in conjunction with two laser video projection systems. Each laser video projection system displays "left" and "right" side images onto the screen, so viewers located in the specific zone can view the stereoscopic images.

What is claimed is:

1. A laser projection video system, which system comprises:
   a) a pulsed laser video image projection means powered as a light source with coherent pulsed laser R,G, B light to display a full color video image, corresponding to electrical signals representing the images on a projection screen means; and b) a projection screen means with a projection surface to receive the full color video image on the projection screen surface for viewing; the projection screen having a first holographic diffusely-reflecting layer thereon to reflect back the full color video image substantially only in a selected viewing direction and to transmit substantially ambient light through the projection screen means to provide for high video picture contrast on the projection screen.

2. The system of claim 1 wherein the holographic layer provides predetermined horizontal and vertical distribution zones to shape the full color video image into defined narrow viewing areas.

3. The system of claim 1 wherein the holographic layer includes a second layer of a diffracting holographic pattern to direct the reflected video image to separate selected viewing zones.

4. The system of claim 3 wherein the viewing zones are right and left viewing zones relative to the viewer.

5. The system of claim 3 wherein the full color video image is a stereoscopic video image.

6. The system of claim 3 wherein the screen comprises a second selected holographic layer on the back surface of the second layer.

7. The system of claim 6 wherein the second layer comprises a transparent plastic film material.

8. The system of claim 1 wherein the projection screen means includes a holographic reflecting layer of less than about 0.0002 inches on a transparent plastic film screen surface.

9. The system of claim 1 wherein the projection screen means includes a transparent plastic projection screen surface with a back surface and having a first holographic reflecting layer on the back surface, and a holographic diffracting layer in front of the first holographic layer to provide selected viewing zones and a three dimensional image to a viewer.

10. The system of claim 9 wherein the pulsed layer video image projection means includes a first and second projection means each powered by R,G and B pulsed lasers with video input signals from first and second spatially displaced cameras to project different first and second images onto the projection screen means.

11. A projection screen adapted to receive a projected image of R,G and B wave lengths thereon for a viewer, which projection screen comprises a transparent plastic material having a front projection surface for viewing a projected image, and having a thin film first diffusely-reflecting holographic layer on the back surface thereof to reflect back to the viewer the projected image of the R,G and B wave lengths in a selected direct viewing zone and to transmit ambient light through the transparent plastic material to provide for a high contrast image on the front projection surface.

12. The screen of claim 11 which includes a second thin film diffracting holographic layer in front of the first layer to diffract a portion of the image to selected viewing zones.

13. The screen of claim 12 which comprises a polyester or polycarbonate transparent plastic material and wherein the first and second holographic layer are contact printed layers of about 0.0002 inches or less.

14. A method of providing a high contrast laser video image for a viewer as a projection screen, which method comprises:

a) modulating red (R), green (G), and blue (B) light to form a full color laser video image corresponding to electrical signals representing the images; and b) projecting the full color laser video image onto a projection screen compound of a transparent material to transmit the passage of ambient light and having a thin film holographic layer on the projection screen to reflect back to the viewer only the full color laser video image, thereby providing a high contrast full color image for viewing.

15. The screen of claim 11 wherein the image is generated by a R,G and B laser light source and the first holographic layer reflects back to the viewer only those R,G, and B wave lengths of the light source.

16. The screen of claim 11 wherein the first holographic layer comprises a photo polymerizable material with one or more holographic patterns thereon.

17. The screen of claim 12 wherein the second holographic layer diffracts the image to selected left and right viewing zones.

18. The screen of claim 11 wherein the first holographic layer comprises a plurality of selected holographic patterns to reflect back monochromatic R,G and B wave lengths.

19. The screen of claim 12 wherein the color images comprises a stereoscopic laser image and the diffracting holographic layer provides left and right viewing zones to produce a three dimension image to the viewer.

20. In combination, a light source to provide a monochromatic or semi-monochromatic R,G and B full color image onto a projection screen, and wherein the projection screen comprises the projection screen of claim 11.

* * * * *